US006571096B2

(12) United States Patent
Plunkett

(10) Patent No.: US 6,571,096 B2
(45) Date of Patent: May 27, 2003

(54) METHOD AND DEVICE FOR PREVENTING TOGGLING BETWEEN TWO ZONES OF A WIRELESS COMMUNICATIONS NETWORK

(75) Inventor: Robert Thomas Plunkett, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/438,055

(22) Filed: Nov. 10, 1999

(65) Prior Publication Data

US 2001/0049287 A1 Dec. 6, 2001

Related U.S. Application Data

(60) Provisional application No. 60/110,469, filed on Nov. 30, 1998, and provisional application No. 60/108,112, filed on Nov. 12, 1998.

(51) Int. Cl.[7] .................................................. H04Q 7/20
(52) U.S. Cl. ........................ 455/436; 455/437; 455/443; 455/449
(58) Field of Search ................................ 455/436, 437, 455/443, 448, 449, 432, 462, 552, 553, 442, 414; 370/331

(56) References Cited

U.S. PATENT DOCUMENTS

| | | | | |
|---|---|---|---|---|
| 4,799,253 A | * | 1/1989 | Stern et al. .................. | 455/448 |
| 5,432,842 A | * | 7/1995 | Kinoshita et al. ............ | 455/440 |
| 5,442,806 A | * | 8/1995 | Barber et al. ................ | 455/435 |
| 5,454,028 A | * | 9/1995 | Hara et al. ................... | 455/437 |
| 5,513,246 A | * | 4/1996 | Jonsson et al. .............. | 455/443 |
| 5,640,677 A | * | 6/1997 | Karlsson ...................... | 455/434 |
| 5,732,350 A |   | 3/1998 | Marko et al. | |
| 5,790,528 A | * | 8/1998 | Muszynski ................... | 370/331 |
| 5,802,468 A | * | 9/1998 | Gallant et al. ............... | 455/422 |
| 5,848,063 A | * | 12/1998 | Weaver, Jr. et al. ......... | 370/331 |
| 5,857,154 A | * | 1/1999 | Laborde et al. .............. | 455/444 |
| 5,862,483 A | * | 1/1999 | Fletcher et al. .............. | 455/435 |
| 5,873,033 A | * | 2/1999 | Hjern et al. .................. | 455/417 |
| 5,878,349 A | * | 3/1999 | Dufour et al. ................ | 455/438 |
| 5,950,125 A | * | 9/1999 | Buhrmann et al. .......... | 455/422 |
| 5,974,318 A | * | 10/1999 | Satarasinghe ................ | 455/436 |
| 5,999,521 A | * | 12/1999 | Thompson ................... | 370/328 |
| 6,009,328 A | * | 12/1999 | Muszynski ................... | 455/422 |
| 6,181,943 B1 | * | 1/2001 | Kuo et al. .................... | 45/437 |

FOREIGN PATENT DOCUMENTS

| | | |
|---|---|---|
| EP | 0 439 628 A1 | 8/1991 |
| WO | WO94/16529 | 7/1994 |
| WO | WO95/28063 | 10/1995 |
| WO | WO97/33448 | 9/1997 |

* cited by examiner

Primary Examiner—Edward F. Urban
Assistant Examiner—Erika A Gary
(74) Attorney, Agent, or Firm—Staas & Halsey LLP

(57) ABSTRACT

A method and device for preventing toggling between two zones of a wireless communications network employ first and second adjacent cells respectively offering services of first and second different zones. The mobile unit determines if the second zone is more preferable than the first zone when the mobile unit hands off from the first cell to the second cell. If the second zone is less preferable than the first zone, the mobile unit does not switch to the second zone within the second cell. If the second zone is more preferable, the first zone is maintained within the second cell until the signal strength of the second cell exceeds the signal strength of the first cell by an amount determined by an exit parameter. At this point, the mobile unit switches to the services of the second zone. Alternatively, after the mobile unit enters the second cell from the first cell, the mobile unit may be prevented from using services of the second zone if there is a hysteresis parameter associated with the second zone in the second cell and the mobile unit was not using services of the second zone in the first cell, before entering the second cell. Even if there is a hysteresis parameter associated with the second zone in the second cell, the mobile unit may be permitted to power up in the second cell on the second zone.

22 Claims, 4 Drawing Sheets

METHOD AND DEVICE FOR PREVENTING TOGGLING BETWEEN TWO ZONES OF A WIRELESS COMMUNICATIONS NETWORK

CROSS-REFERENCE TO RELATED APPLICATIONS

This application is based on and claims priority to U.S. Provisional Application Nos. 60/110,469, filed Nov. 30, 1998 and 60/108,112, filed Nov. 12, 1998.

BACKGROUND OF THE INVENTION

1. Field of the Invention

The present invention relates in general to a wireless communications network that offers different services in different zones thereof. More specifically, the present invention relates to preventing toggling between the different zones of the wireless communications network.

2. Description of the Related Art

FIG. 1 is a schematic view of a conventional wireless communications network. The network shown in FIG. 1 has zone A and zone B. Each of the circles in FIG. 1 represents a cell. A zone can be made up of one or more cells. The zones are differentiated based on the services offered. For example, zone A may be a home zone to users residing therein. Within the home zone, the user may be given a more favorable calling rate or the user may be given more features in the home zone. The system shown in FIG. 1 may be implemented in a single network having different tiers of services. The planned Tiered Services in CDMA 2000 networks is one example of different tiers of services.

When the user travels between the cells shown in FIG. 1, the mobile unit must change the cell with which it is communicating. This is done in a "hand-off." The mobile unit is designed to operate on the cell having the strongest signal. In the overlapping areas in FIG. 1, communication is available on more than one cell. Changing signal strength in the overlapping areas can result in multiple hand-offs between cells at the boundary thereof. Signal strength changes occur due to movement of the mobile unit itself and due to movement of objects between the mobile unit and the associated cell sites. Multiple hand-offs are generally not a matter that concerns the user.

The shaded portion of FIG. 1, where zone A overlaps zone B, represents an area where communication is available on either zone A cells or zone B cells. If multiple hand-offs cause the mobile unit to toggle back and forth between cells of different zones, the user's service is changing, and this creates problems for the user. For example, in the process of dialing a phone number to be called, at the beginning of the dialing sequence, the user may be within zone A. At this point, the user may be entitled to a free call and may not be required to dial the complete phone number, including area code. However, after the user inputs the full dialing sequence, the mobile unit may have switched to zone B. Not only will the user be forced to pay a higher rate, but the user's call may not go through because the user did not dial the complete phone number, including area code.

SUMMARY OF THE INVENTION

Accordingly, it is an object of the present invention to prevent a mobile unit from toggling back and forth between different zones of a wireless communications network.

This and other objects are accomplished by a providing a method and device for preventing toggling between two zones of a wireless communications network. The method and device employ first and second adjacent cells respectively offering services of first and second different zones. The mobile unit determines if the second zone is more preferable than the first zone when the mobile unit hands off from the first cell to the second cell. If the second zone is less preferable than the first zone, the mobile unit does not switch to the second zone within the second cell. If the second zone is more preferable, the first zone is maintained within the second cell until the signal strength of the second cell exceeds the signal strength of the first cell by an amount determined by an exit parameter. At this point, the mobile unit switches to the services of the second zone.

Alternatively, after the mobile unit enters the second cell from the first cell, the mobile unit may be prevented from using services of the second zone if there is a hysteresis parameter associated with the second zone in the second cell and the mobile unit was not using services of the second zone in the first cell, before entering the second cell. Even if there is a hysteresis parameter associated with the second zone in the second cell, the mobile unit may be permitted to power up in the second cell on the second zone.

BRIEF DESCRIPTION OF THE DRAWINGS

The invention will be readily understood by reference to the following description of preferred embodiments described by way of example only, with reference to the accompanying drawings in which like reference characters represent like elements, wherein.

DETAILED DESCRIPTION OF THE PREFERRED EMBODIMENTS

Figure 1:
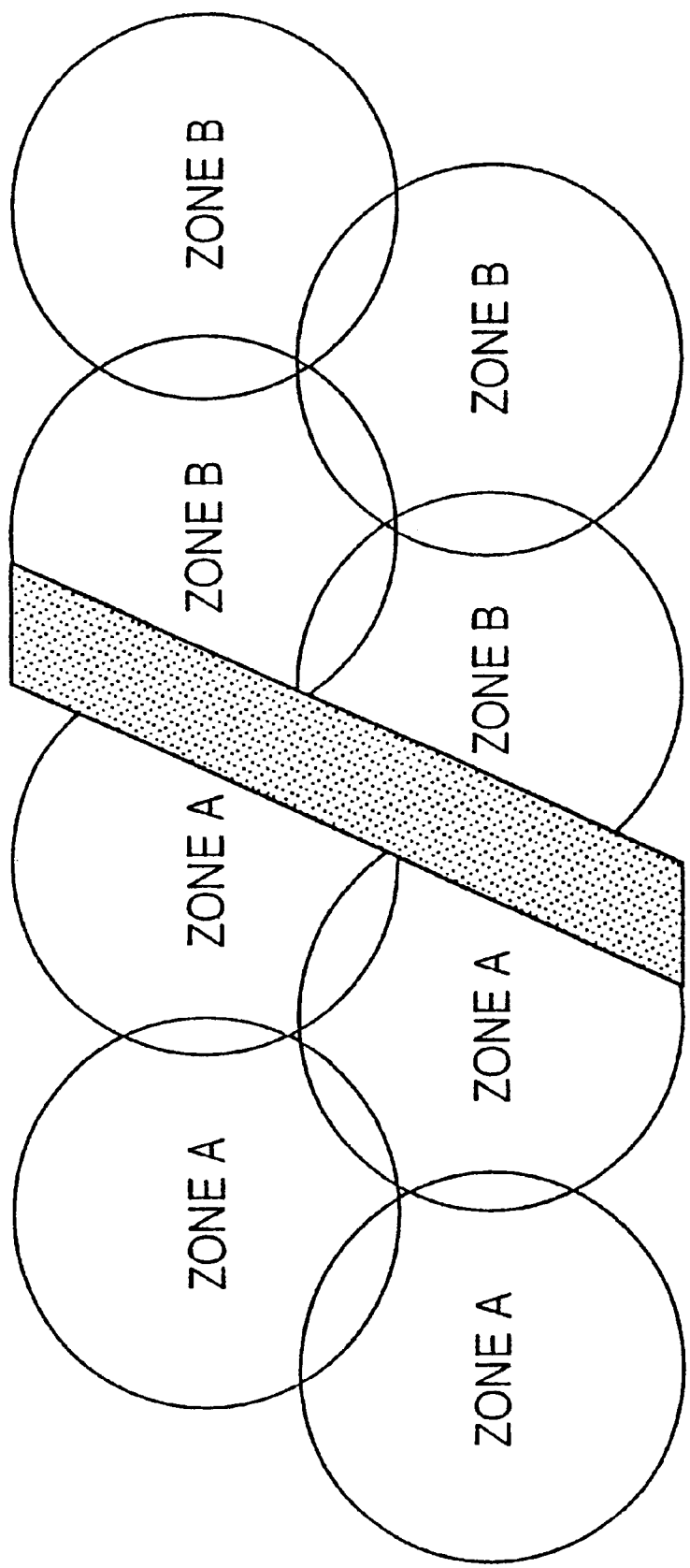
FIG. 1 is a schematic view of a conventional wireless communications network having a plurality of zones.
Figure 2:
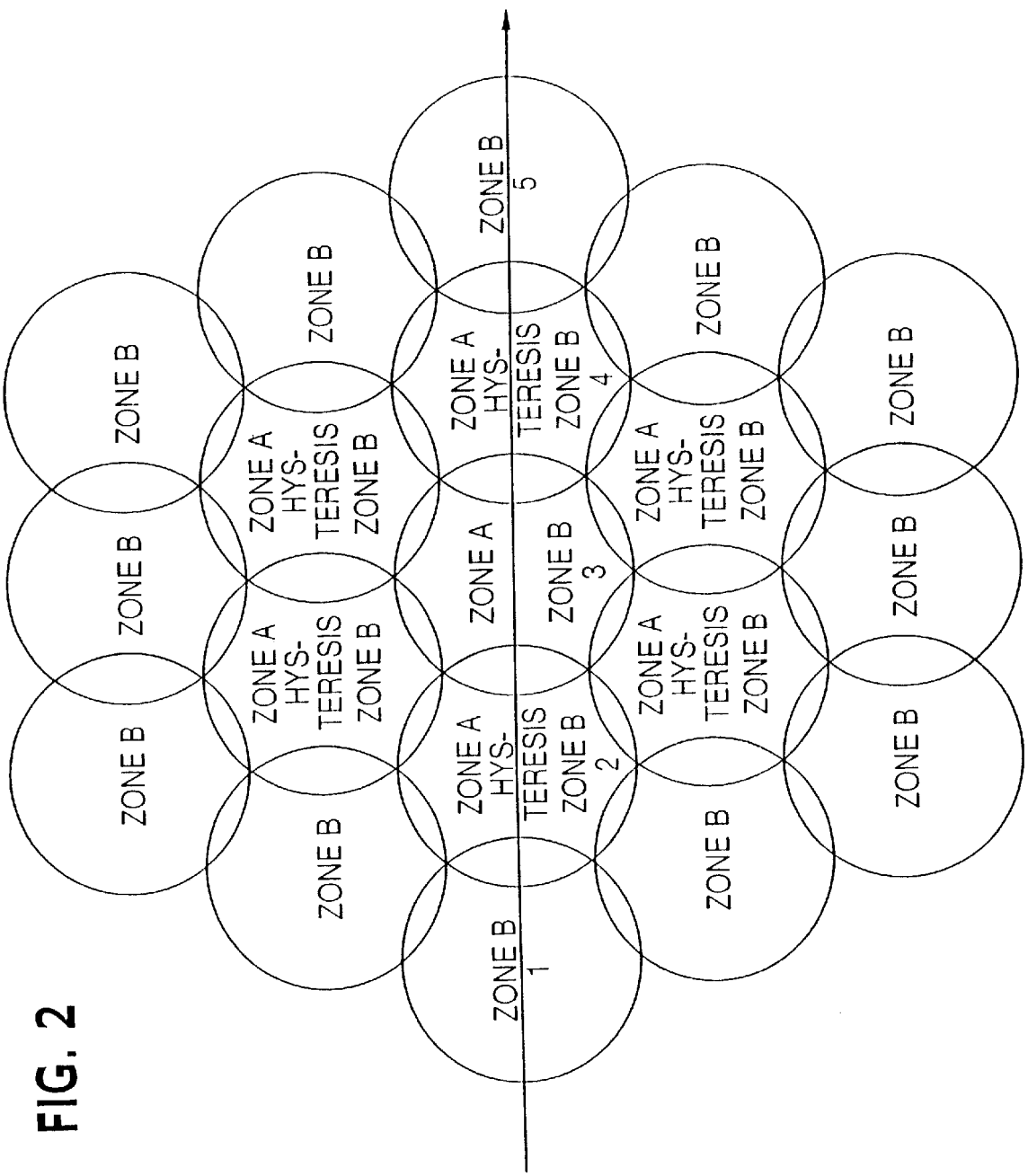
FIG. 2 is a schematic view of a first wireless communications network according to a first preferred embodiment of the present invention.

FIG. 2 is a schematic view of a wireless network according to a first preferred embodiment of the present invention. Like FIG. 1, each of the circles represents a cell. Within each cell user zone IDs identify the zones available. When a mobile unit changes cells, the user zone IDs of the new cell are transmitted to and received by the mobile unit. In the FIG. 2 network, user zone IDs inform the mobile unit that zone A and/or zone B is available. All cells support the services of zone B. In addition to zone B, the center seven cells also support the services of zone A. The six outer cells that support zone A are designated as hysteresis cells for zone A. Depending upon internal preferences programmed within it, the mobile unit prefers to access one zone over another zone. In our example, the mobile unit prefers to access the services of zone A.

The mobile unit will use zone B, the only available zone, in cell 1. In moving from the outer cells of the diagram to the inner cells, the mobile unit will continue to use zone B services in cell 2. This is because the cells surrounding the inner most cell are designated as hysteresis cells for zone A. The mobile unit will not seek the services associated with zone A until it has reached the inner most cell (cell 3), the zone A cell without hysteresis. This same mobile unit, in moving from the inner most cell (cell 3) to the outer cells (cells 4 and 5) will continue using zone A in cell 4. This is because the mobile unit prefers to access zone A. The mobile will not switch to zone B services until it has reached cell 5, which supports only zone B services.

The effect of the hysteresis parameter is to create a gap between when the mobile unit can obtain the services of zone A and when the mobile unit can drop the services of zone A. This gap prevents the toggling between zone A and zone B that would normally result if the entry and exit points for zone A were at the same cell boundary and the mobile was in the proximity of the boundary.

It is important to understand that the hysteresis parameter does not alter the timing of handoffs between cells. The mobile unit will switch from one cell to an adjacent cell when the signal strength of the new cell exceeds the signal strength of the old cell. It is also important to understand that the hysteresis parameter can eliminate toggling by altering only the entrance point into a new zone. In our example, the mobile unit exits zone A as it would without any hysteresis parameter. That is, the mobile unit prefers zone A over zone B, and therefore, the mobile unit continues to access zone A until it is no longer available (at the normal handoff point to one of the outer cells supporting only zone B services).

A hysteresis parameter is associated with only one zone. In the FIG. 2 example, the six intermediate cells are zone A hysteresis cells and have the zone A hysteresis parameter set. If there were three zones (perhaps zones A, B and C) available in the FIG. 2 example, the presence of the zone A hysteresis parameter in the intermediate cells would have no effect on the change of zones between zones B and C. Separate hysteresis parameters for zones B and C would be required to achieve this objective.

With regard to how the hysteresis parameter is implemented, it may be transmitted to the mobile unit by the cells. As mentioned previously, the network transmitters within the cells transmit user zone IDs identifying the zones available in that cell. The hysteresis parameter may be appended to the user zone ID. In this case, the user zone ID informs the mobile unit that a zone is available in the cell and informs the mobile unit that it cannot access the zone unless it was previously using the zone.

As an alternative to having the user zone IDs and/or hysteresis parameters transmitted to the mobile unit, the mobile unit may use other identification parameters broadcast by the cell site to identify what user zone it is in and the state of the hysteresis parameter. Cell sites typically broadcast system IDs, network IDs, basestation IDs and basestation position (latitude and longitude). By using a cross reference table stored in mobile unit memory, between these identification parameters and the user zone IDs and hysteresis parameters, the mobile unit may use any or all of these identification parameters to identify the corresponding user zone(s) and hysteresis parameter(s) for a given cell. As in the earlier example, the mobile unit would then use internally stored preferences to select the appropriate user zone.

Figure 3:
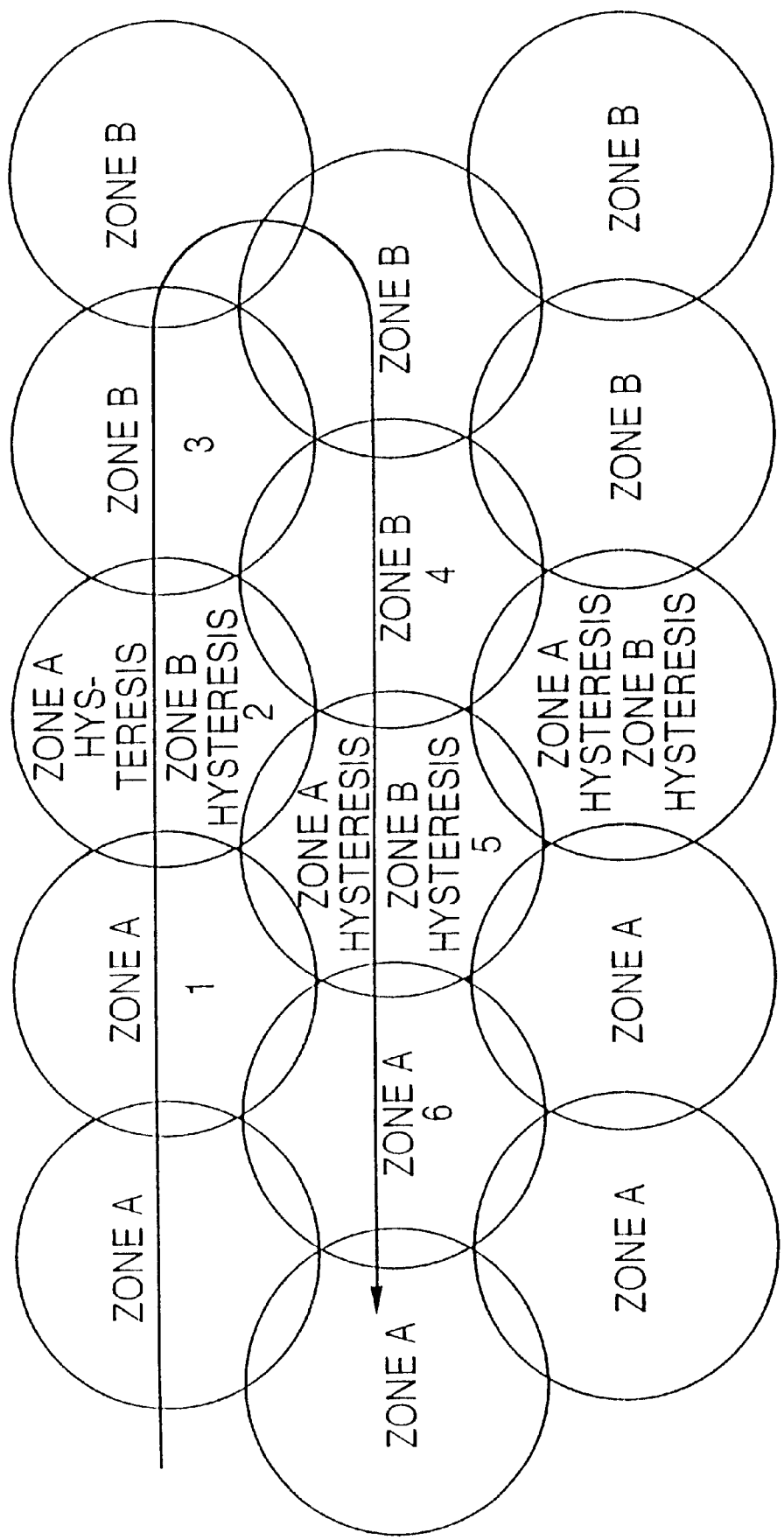
FIG. 3 is a schematic view of a second wireless communications network according to the first preferred embodiment of the present invention.

The FIG. 2 example demonstrates how the mobile unit selects the zone of operation when entering a hysteresis zone cell from another cell. The user continues to access the previous zone. FIG. 3 illustrates an example where the overlap of zones is minimal. This case would be typical of a zone dialing application where the user needs to know what zone the mobile unit is in before dialing a number but otherwise has no preference for any particular zone. In FIG. 3, the center three cells offer services of both zone A and zone B. A mobile unit moving from west to east (left to right in FIG. 3) would first use the services offered by zone A (see area 1) and would continue to use zone A until reaching the boundary between areas 2 and 3. At this point, the mobile unit would switch to the services offered by zone B. Reversing direction, the mobile unit would continue to access the services of zone B until reaching the boundary between area 5 and area 6 where it would revert back to using the services of zone A.

It is of course possible that the user could power up the mobile unit within a cell having the hysteresis parameter set for the preferred zone. This could happen in areas 2 and 4 of FIG. 2 and areas 2 and 5 of FIG. 3. In FIG. 2 the unavailability of zone A (the preferred zone) would not be a problem since zone B (the less preferred zone) is available. In areas 2 and 4 of FIG. 2, the mobile unit could power up using the services of zone B. In areas 2 and 5 of FIG. 3, however, the hysteresis parameter is set for all available zones. The mobile unit would normally be blocked from accessing both zone A and zone B. To avoid such a problem, an additional parameter ("the power up parameter") is provided to permit the mobile unit to power up using the services of a zone that would otherwise be prohibited. Upon powering up in a cell, the mobile unit is prohibited from accessing a zone only if the hysteresis parameter is set for that zone and the power up parameter is not set.

Like the hysteresis parameter, the power up parameter may be broadcast by the cell or may be stored within the mobile unit and obtained by matching. To accommodate the power up parameter, the hysteresis parameter could be transmitted as two bits of information. The first bit could inform the mobile unit as to whether hysteresis is on. The second bit could inform the mobile unit as to whether it is permitted to access the associated zone after powering up in the cell.

There may be circumstances where a mobile unit, at power up, can access several zones. There are various way to accommodate this situation. The mobile unit might prefer zones for which the hysteresis parameter is not set. In this case, the mobile unit uses a zone having hysteresis and the power up parameter only if all zones have the hysteresis parameter set.

The first embodiment prevents toggling between different user zones. In the simplest implementation, toggling is eliminated by associating a hysteresis parameter with selected cells of a user zone. The result is that the entry point for a user zone is well inside the exit point for that user zone. These hysteresis cells would typically surround a user zone. Of course, all cells having a hysteresis parameter set for a zone must support the services of that zone. In the network shown in FIG. 1, none of the cells support both zone A and zone B. Accordingly, to implement the present invention in the network shown in FIG. 1 appears to require that one or more of the cells be reconfigured to support both zone A and zone B. However, the base stations respectively defining different cells are connected to a common switching system. The wireless carrier controlling the cells may prefer not to support the services of a particular zone in its cells and normally may not offer the services of that particular zone. However, the wireless carrier is capable of supporting these services in all cells. For the purpose of preventing toggling, the wireless carrier will make the services of a particular zone available, even if those services are not normally offered.

The above description is based on the concept of cells being the smallest element for definition of a user zone. In cellular systems, cells may be further sub-divided into what are known as sectors. For purposes of user zones, a sector may also be considered a cell in that it may be uniquely assigned one or more user zones, hysteresis parameters and power up parameters.

Figure 4:
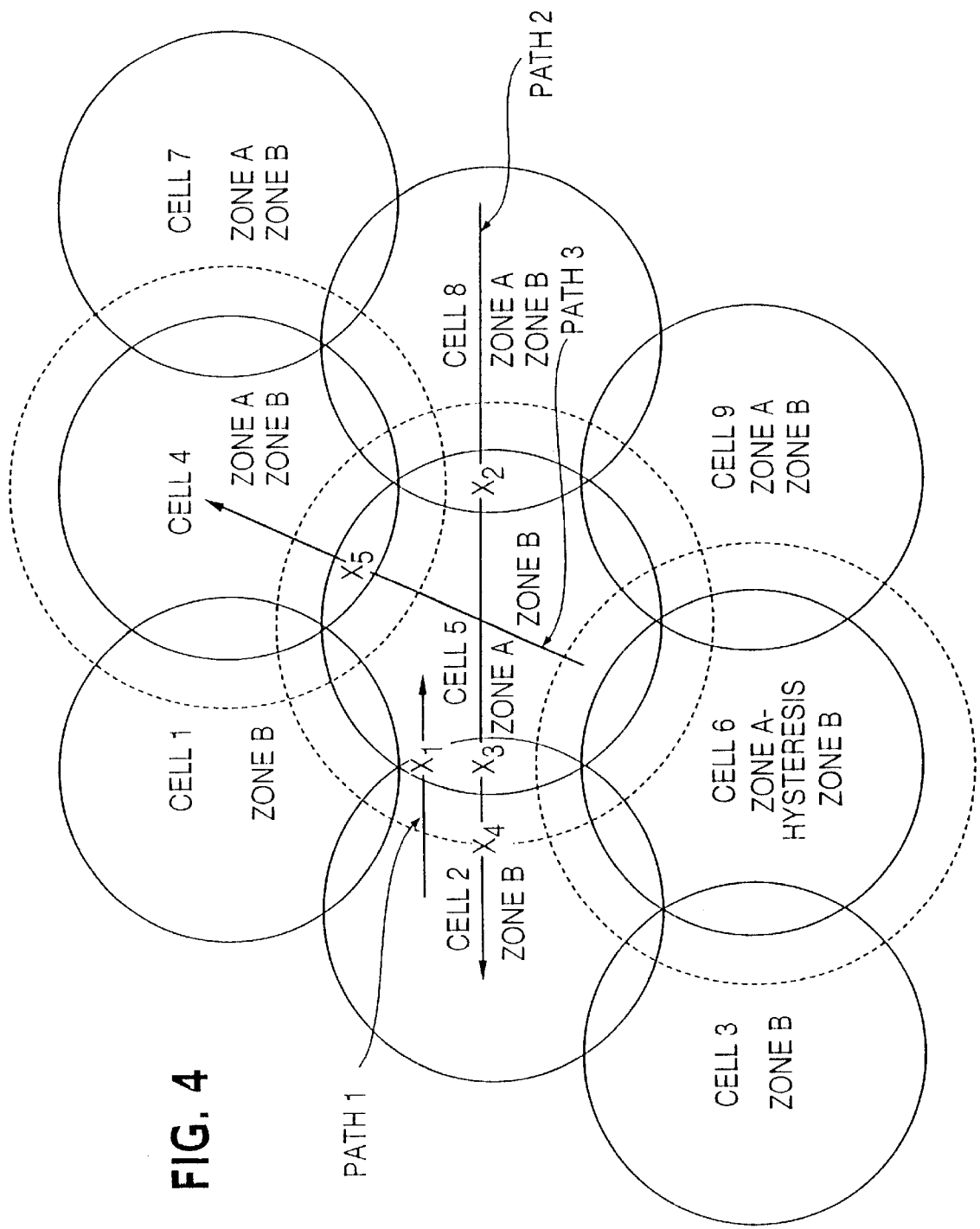
FIG. 4 is a schematic view of a wireless communications network according to a second preferred embodiment of the present invention.

FIG. 4 is a schematic view of a wireless network having a plurality of zones according to a second preferred embodiment of the present invention. The second preferred embodiment is similar to the first preferred embodiment, and only the differences will be described. According to the second preferred embodiment a new parameter, referred to as the "User Zone Exit Parameter (UZXP)," is defined. Every zone within a cell has a UZXP associated therewith. When the mobile unit performs a handoff from an old cell to a new cell, the mobile unit receives or internally identifies a list of user zones available within the new cell. For example, the mobile unit may receive the user zone IDs of each available zone. At this point, the mobile unit refers to a list of zone preferences stored therein. If the zone currently accessed is available in the new cell and is more preferable than any other zone available in the new cell, the mobile unit will continue to operate on that zone. On the other hand, if the mobile unit determines that one of the zones being offered by the new cell is more preferable than the zone currently being used, the mobile unit would like to switch to the new zone. Before the mobile unit can exit the old zone, the following equation must be satisfied:

$$\frac{PQ_o}{PQ_n} < UZXP_o$$

where:

PQ is a measure of the pilot quality for a cell (one implementation would use the parameter Ec/Io as the value for PQ). $PQ_n$ represents the pilot quality of the new cell. $PQ_o$ represents the pilot quality of the old cell.

$UZXP_o$ is the user zone exit parameter of the zone currently being used, for the old cell. UZXP is typically a unitless fraction. If the equation $(PQ_n-PQ_o) > UZXP_o$ is used, UZXP would be positive number in dB.

The effect of UZXP is to delay the exit from a zone until past the normal idle mode handoff point. As with the first embodiment, the handoff point remains unchanged. At the time of handoff, the mobile unit learns the zones available in the new cell. If the old zone is available in the new cell, and if the old zone is more preferable than any other zone available in the new cell, the mobile unit does not evaluate the UZXP equation and continues operation on the old zone. However, as soon as the mobile unit determines that a user zone change is unnecessary, the UZXP stored in the mobile unit is updated so that the UZXP corresponds with the zone (same zone) and the cell (new cell) being used. If there is no change in zones, the UZXP can be updated without delay.

If the new cell, however, does not support services associated with the user zone previously being used, those services will be offered to the mobile unit on a provisional basis. The mobile unit will evaluate the above UZXP equation as described above to determine the exit point where the mobile unit will switch to one of the zones normally supported by the cell. The cell will expect that the mobile unit will discontinue using the old zone as soon as the equation is satisfied.

If the new cell supports the old zone, but the old zone is less preferred than one of the other zones available in the new cell, the mobile unit would evaluate the UZXP equation, as mentioned above. Once the signal strength of the new cell exceeds the signal strength of the old cell by UZXP, the mobile unit switches zone. At that point, the mobile updates the UZXP stored therein. The UZXP of the new zone and new cell replaces the old UZXP. Note that before the mobile unit switches zones, it maintains the old UZXP. This is different from the situation where there is no zone change.

There are several ways to implement the UZXP. In the example described above, there is a UZXP for each zone within a cell. If the UZXP is set to zero, the transition from an old zone to a new zone occurs at the normal handoff point. As an alternative to this, perhaps only selected zones and cells would have a UZXP associated therewith. For example, only the border cells of a zone would have a UZXP. Within a given zone, if a cell did not have a UZXP, the transition out of that zone would occur at the normal handoff point.

Unlike the first embodiment, no special provisions are required to allow the user to power up. The UZXP alters when mobile units exit a zone, but does not alter when mobile units enter a zone.

As with the hysteresis parameter, there are different ways the mobile unit can obtain the UZXP. The UZXP can be transmitted along with the corresponding user zone ID to the mobile unit by the cell. Alternatively, like the first embodiment, the mobile unit may use a cross reference table stored in mobile station memory, to identify user zone IDs and UZXPs associated with cell identification parameters such as system IDs, network IDs, basestation IDs and basestation position (latitude and longitude). Further, it is possible that both the transmission method and the cross reference table method would be used in a single network.

It should be noted that each cell has three sectors, and there may be a UZXP for each sector. Regardless of the number of UZXPs, the method of obtaining the UZXP is generally the same.

The operation of a network employing the second preferred embodiment is illustrated in the FIG. 4. In this example cells 4, 5 and 6 all have non-zero values for UZXP. A typical value for UZXP could be +8 dB (assuming that the equation evaluated is $PQ_n-PQ_o > UZXP$). The outer dashed lines represent schematically the effect of the UZXP parameter. The following mobile station paths illustrate how the second preferred embodiment would work under various scenarios:

Path 1—A mobile unit (with a preference for user zone A) following the short line from left to right, moves from cell 2 to cell 5. Cell 2 does not offer zone A and has a UZXP of zero for zone B. In travelling, the mobile unit begins communication with the new cell and the new user zone at the normal idle mode handoff point designated $X_1$. This occurs since cell 2 has a zero value for UZXP for zone B. Once past point $X_1$ the mobile unit begins receiving the services associated with zone A.

Path 2—A mobile unit follows the longer line from right to left from cell 8 to cell 5, then to cell 2. Both cells 5 and 8 offer the preferred zone, zone A. As the mobile unit travels from cell 8 to cell 2, it performs normal idle mode handoff at point $X_2$ the equal power point between the two cells. Since both cell 8 and cell 5 support the preferred zone, there is no change in zone services. Cell 5 has a non-zero UZXP value for zone A. As the mobile moves through cell 5 and hits point $X_3$, normal idle mode handoff procedures would result in a handoff to cell 2. Since cell 2 does not support user zone A, the mobile station would begin to evaluate the UZXP equation for the pilot quality of cell 5 versus the pilot quality for cell 2. The value for UZXP used to evaluate the equation is of course the UZXP for zone A in cell 5. At point $X_4$ the value of $PQ_5/PQ_2$ drops below the value of $UZXPA_{A,5}$. The equation is now satisfied and the mobile station exits zone A and beginning to use zone B services.

Path 3—Following the path from the lower left to the upper right of FIG. 4, the mobile unit moves from cell 5 to cell 4. Both cells 5 and 4 support zone A services. Further, both cells 5 and 4 have a non-zero value for the zone A UZXPs. Upon passing through point $X_5$, the equal power point between cell 5 and cell 4, the mobile unit performs idle mode handoff to cell 4. The control channels of cell 4 and decoded, and the mobile unit determines that zone A is supported on cell 4. Since cell 5 and cell 4 both support the preferred zone (zone A), there is no need to evaluate the UZXP equation. The mobile continues to use the services associated with zone A. However, should it be necessary to evaluate the UZXP equation when the mobile unit leaves cell 4 (for example, to go to cell 1), the UZXP for cell 4 will be used. That is, the mobile unit will update the UZXP stored therein.

The second embodiment is described above as having a UZXP for each zone/cell combination. If the UZXP is not to alter a zone transition point, the value of UZXP is either 1 (if the ratio equation is used) or 0 (if the difference equation is used). Alternatively, if there is no need to alter the zone transition point, it is also possible that some of the zone/cell combinations would not have a UZXP. The mobile continues to use the services associated with zone A.

The second embodiment is described above as having a parameter that only alters when mobile units exit a zone. It is alternatively possible that the invention could alter when mobile units enter a zone. Further, it is possible the that invention could alter both when mobile units enter and exit a zone.

While the invention has been described in connection with the preferred embodiments, it will be understood that modifications within the principles outlined above will be evident to those skilled in the art. For example, the size, number and configuration of the cells shown in FIG. 5 is arbitrary. Also, the hysteresis parameter could be implemented in a number of different ways. Thus, the invention is not limited to the preferred embodiments, but is intended to encompass such modifications.

What is claimed is:

1. A method of preventing toggling in a wireless network having first and second adjacent cells, the first cell offering services of at least a first zone, the second cell offering services of both the first zone and a second zone, the services of the first zone being different from the services of the second zone, comprising:

maintaining the services of the first zone after a mobile unit hands off from the first cell to the second cell; and switching to the services of the second zone after the mobile unit travels within the second cell, past the hand off point to the second cell, wherein the transition point to the second zone is offset from the handoff point to the second cell.

2. A method according to claim 1, wherein the services of the first zone are maintained within the second cell until the signal strength of the second cell exceeds the signal strength of the first cell by a predetermined amount.

3. A method according to claim 1, wherein the services of the first zone are maintained within the second cell until the signal strength of the second cell exceeds the signal strength of the first cell by an amount equivalent to an exit parameter, the exit parameter depending on the identities of the cell and zone with which the mobile unit was communicating prior to entering the second cell.

4. A method according to claim 3, wherein the exit parameter is transmitted to the mobile unit by the cell with which the mobile unit was communicating prior to entering the second cell.

5. A method according to claim 3, wherein the exit parameter is obtained from a list of exit parameters stored in the memory of the mobile unit, an appropriate exit parameter being selected from the list based on the identities of the cell and zone with which the mobile unit was communicating prior to entering the second cell.

6. A method according to claim 3, wherein the exit parameter is updated to correspond with the second cell and the second zone after the mobile unit has switched to the services of the second zone.

7. A wireless network for preventing a mobile unit from toggling between services of first and second zones, comprising:

a first cell to offer services of at least the first zone; and a second cell, adjacent to the first cell, to offer services of the first and second zones, the services of the first zone being different from the services of the second zone, the first and second cells overlapping at a handoff point where a mobile unit switches communication between the first and second cells, the second cell maintaining the services of the first zone after the mobile unit switches communication to the second cell at the hand off point, the second cell switching to the services of the second zone after the mobile unit travels within the second cell, past the hand off point.

8. A method of preventing toggling in a wireless network having first and second adjacent cells and second and third adjacent cells, the first cell offering services of at least a first zone, the second cell offering services of both the first zone and a second zone, the third cell offering services of at least the second zone, the services of the first zone being different from the services of the second zone, wherein a mobile unit hands off when the mobile unit moves between the cells, comprising:

determining if the services of the second zone are more preferable to the mobile unit than the services of the first zone when the mobile unit moves from the first cell to the second cell;

maintaining the services of the first zone after the mobile unit moves from the first cell to the second cell even if the services of the second zone is more preferable to the mobile unit than the services of the first zone, the second cell being a hysteresis cell for the service of the second zone; and switching from the services of the first zone to the services of the second zone when the mobile unit moves from the second cell to the third cell.

9. A wireless network system for allowing a mobile unit which hands off between cells to switch services of each zone, comprising:

a first cell offering service of a first zone;

a second cell offering services of both the first zone and a second zone, the services of the first zone being different form services of second zone; and a third cell allocated between the first cell and the second cell and designated as hysteresis cell for the second zone, offering service of both the first zone and the second zone;

wherein the system prevents the mobile unit from switching from services of the second zone to services of first zone when the mobile unit hands off from second cell to third cell if the second zone is more preferable than the first zone, and the system allows the mobile unit to switch from services of the second zone to services of first zone when the mobile unit hands off from third cell to first cell.

10. The wireless network system according to claim 9, wherein the mobile unit powers up within the third cell having a hysteresis parameter set for the second zone.

11. The wireless network system according to claim 9, wherein the system prevents the mobile unit from switching from services of the first zone to services of the second zone when the mobile unit hands off from the first cell to the third cell even though the second zone is more preferable than the first zone, and the system allows the mobile unit to switch from services of the first zone to services of the second zone when the mobile unit hands off from the third cell to the second cell.

12. The wireless network system according to claim 11, wherein the mobile unit powers up within the third cell having a hysteresis parameter set for the second zone.

13. A method of allowing a mobile unit which hands off between cells to switch services of each zone, a first cell offering service of a first zone, a second cell offering services of both the first zone and a second zone, the services of the first zone being different form services of second zone, a third cell allocated between the first cell and the second cell and designated as hysteresis cell for the second zone, offering service of both the first zone and the second zone, comprising:

preventing the mobile unit from switching from services of the second zone to services of the first zone when the mobile unit hands off from the second cell to the third cell if the second zone is more preferable than the first zone. and allowing the mobile unit to switch from services of the second zone to services of the first zone when the mobile unit hands off from the third cell to the second cell.

14. The method according to claim 13, further comprising:

preventing the mobile unit from switching from services of the first zone to services of the second zone when the mobile unit hands off from the first cell to the third cell even though the second zone is more preferable than the first zone, and allowing the mobile unit to switch from services of the first zone to services of the second zone when the mobile unit hands off from the third cell to the second cell.

15. A wireless network system for allowing a mobile unit which hands off between cells to switch services of each zone, comprising:

a first cell offering service of a first zone;

a second cell offering service of a second zone, the service of the first zone being different form service of second zone; and a third cell allocated between the first cell and the second cell and designated as hysteresis cell for the first zone and the second zone, offering services of both the first zone and the second zone;

wherein the system prevents the mobile unit from switching from services of the second zone to services of first zone when the mobile unit hands off from second cell to third cell if the second zone is more preferable than the first zone, and the system allows the mobile unit to switch from services of the second zone to services of first zone when the mobile unit hands off from third cell to first cell.

16. The wireless network system according to claim 15, wherein the mobile unit powers up within the third cell having a hysteresis parameter set for the second zone.

17. The wireless network system according to claim 15, wherein the system prevents the mobile unit from switching from services of the first zone to services of the second zone when the mobile unit hands off from the first cell to the third cell even though the second zone is more preferable than the first zone, and the system allows the mobile unit to switch from services of the first zone to services of the second when the mobile unit hands off from the third cell to the second cell.

18. The wireless network system according to claim 17, wherein the mobile unit powers up within the third cell having a hysteresis parameter set for the second zone.

19. A method of allowing a mobile unit which hands off between cells to switch services of each zone, a first cell offering service of a first zone, a second cell offering service of a second zone, the service of the first zone being different form service of second zone, a third cell allocated between the first cell and the second cell and designated as hysteresis cell for the first cell and the second zone, offering service of both the first zone and the second zone, comprising:

preventing the mobile unit from switching from services of the second zone to services of the first zone when the mobile unit hands off from the second cell to the third cell if the second zone is more preferable than the first zone. and allowing the mobile unit to switch from services of the second zone to services of the first zone when the mobile unit hands off from the third cell to the first cell.

20. The method according to claim 19, further comprising:

preventing the mobile unit from switching from services of the first zone to services of the second zone when the mobile unit hands off from the first cell to the third cell even though the second zone is more preferable than the first zone, and allowing the mobile unit to switch from services of the first zone to services of the second zone when the mobile unit hands off from the third cell to the second cell.

21. A wireless network system for allowing a mobile unit which hands off between cells to switch services of each zone, comprising:

a first cell offering service of a first zone;

a second cell offering service of both the first zone and a second zone, the service of the first zone being different form service of second zone; and a third cell allocated between the first cell and the second cell and designated as hysteresis cell for the second zone, offering services of both the first zone and the second zone;

wherein the system allows the mobile unit to switch from services of the first zone to services of second zone when the mobile unit hands off from first cell to second cell at the normal handoff point if the second zone is more preferable than the first zone, and the system prevents the mobile unit from switching from services of the second zone to services of first zone at the normal handoff point so that the mobile unit switches from switching from services of the second zone to services of first zone when the mobile unit hands off from the third cell to the first cell at a handoff point which is offset from the normal handoff point.

22. A method of allowing a mobile unit which hands off between cells to switch services of each zone, a first cell offering service of a first zone, a second cell offering service of both the first zone and a second zone, the service of the first zone being different form service of second zone, and a third cell allocated between the first cell and the second cell and designated as hysteresis cell for the second zone, offering services of both the first zone and the second zone, comprising:

allowing the mobile unit to switch from services of the first zone to services of second zone when the mobile unit hands off from first cell to second cell at the normal handoff point if the second zone is more preferable than the first zone; and preventing the mobile unit from switching from services of the second zone to services of first zone at the normal handoff point so that the mobile unit switches from switching from services of the second zone to services of first zone when the mobile unit hands off from the third cell to the first cell at a handoff point which is offset from the normal handoff point.

* * * * *